United States Patent
Fries et al.

(10) Patent No.: US 9,569,259 B2
(45) Date of Patent: *Feb. 14, 2017

(54) VIRTUAL MACHINE MIGRATION TOOL

(71) Applicant: Microsoft Technology Licensing, LLC, Redmond, WA (US)

(72) Inventors: Robert Fries, Kirkland, WA (US); Ashvinkumar Sanghvi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,767

(22) Filed: Oct. 16, 2015

(65) Prior Publication Data

US 2016/0034302 A1 Feb. 4, 2016

Related U.S. Application Data

(63) Continuation of application No. 13/171,446, filed on Jun. 29, 2011, now Pat. No. 9,176,773.

(51) Int. Cl.
*G06F 9/48* (2006.01)
*G06F 9/50* (2006.01)
(Continued)

(52) U.S. Cl.
CPC .......... *G06F 9/4856* (2013.01); *G06F 9/5072* (2013.01); *G06Q 10/00* (2013.01); *H04L 67/1097* (2013.01); *H04L 67/34* (2013.01)

(58) Field of Classification Search
None
See application file for complete search history.

(56) References Cited

U.S. PATENT DOCUMENTS 7,503,042 B2 3/2009 Henrickson et al.
8,321,857 B1 11/2012 Prosso et al.
(Continued)

FOREIGN PATENT DOCUMENTS

CN 101946257 A 1/2011
CN 102033909 A 4/2011
(Continued)

OTHER PUBLICATIONS

Office Action Issued in Taiwan Patent Application No. 101119169, Mailed Date: May 20, 2016, 8 Pages.
(Continued)

*Primary Examiner* — Ranodhi Serrao
*Assistant Examiner* — James Fiorillo
(74) *Attorney, Agent, or Firm* — Henry Gabryjelski; Kate Drakos; Micky Minhas

(57) ABSTRACT

Tools and techniques for migrating applications to compute clouds are described herein. A tool may be used to migrate any arbitrary application to a specific implementation of a compute cloud. The tool may use a library of migration rules, apply the rules to a selected application, and in the process generate migration output. The migration output may be advisory information, revised code, patches, or the like. There may be different sets of rules for different cloud compute platforms, allowing the application to be migrated to different clouds. The rules may describe a wide range of application features and corresponding corrective actions for migrating the application. Rules may specify semantic behavior of the application, code or calls, storage, database instances, interactions with databases, operating systems hosting the application, and others.

20 Claims, 9 Drawing Sheets

(51) Int. Cl.
*H04L 29/08* (2006.01)
*G06Q 10/00* (2012.01)

(56) References Cited

U.S. PATENT DOCUMENTS

| | | | |
|---|---|---|---|
| 8,448,170 B2* | 5/2013 | Wipfel | H04L 9/3213 |
| | | | 718/1 |
| 8,645,529 B2* | 2/2014 | Doddavula | H04L 67/34 |
| | | | 709/223 |
| 9,444,896 B2* | 9/2016 | Zheng | H04L 67/16 |
| 2007/0067766 A1 | 3/2007 | Tal et al. | |
| 2007/0256058 A1 | 11/2007 | Marfatia et al. | |
| 2009/0049438 A1 | 2/2009 | Draper et al. | |
| 2010/0061250 A1 | 3/2010 | Nugent | |
| 2010/0262559 A1 | 10/2010 | Wilcock et al. | |
| 2010/0287263 A1 | 11/2010 | Liu et al. | |
| 2010/0312995 A1 | 12/2010 | Sung | |
| 2010/0318609 A1 | 12/2010 | Lahiri et al. | |
| 2010/0325199 A1 | 12/2010 | Park et al. | |
| 2010/0332629 A1 | 12/2010 | Cotugno et al. | |
| 2011/0055377 A1 | 3/2011 | Dehaan et al. | |
| 2011/0231899 A1 | 9/2011 | Pulier et al. | |
| 2011/0270968 A1 | 11/2011 | Salsburg et al. | |
| 2011/0314069 A1 | 12/2011 | Alatorre et al. | |
| 2012/0066670 A1 | 3/2012 | Mccarthy et al. | |
| 2012/0089726 A1 | 4/2012 | Doddavula | |
| 2012/0254355 A1 | 10/2012 | Kihara | |
| 2012/0304179 A1 | 11/2012 | Devarakonda et al. | |
| 2012/0311154 A1* | 12/2012 | Morgan | H04L 12/6418 |
| | | | 709/226 |
| 2013/0238786 A1* | 9/2013 | Khesin | H04L 67/34 |
| | | | 709/224 |
| 2014/0149591 A1 | 5/2014 | Bhattacharya et al. | |
| 2015/0317177 A1* | 11/2015 | Hussain | H04L 67/1097 |
| | | | 718/1 |
| 2016/0044035 A1* | 2/2016 | Huang | H04L 63/0272 |
| | | | 726/4 |

FOREIGN PATENT DOCUMENTS

| | | |
|---|---|---|
| CN | 102098343 A | 6/2011 |
| JP | 2007140845 A | 6/2007 |
| TW | I294589 | 3/2008 |
| TW | 201044185 A | 12/2010 |
| TW | 201112118 A | 4/2011 |
| WO | 2009116288 A1 | 9/2009 |
| WO | 2011143568 A2 | 11/2011 |

OTHER PUBLICATIONS

A Method and System of Migrating Data for Multi-Tenant in Cloud Computing Environment, In IP.com Prior Art Database Technical Disclosure, IPCOM000201694D, Nov. 18, 2010, 7 pages.

Notice of Allowance Issued in U.S. Appl. No. 13/171,446, Mailed Date Jul. 6, 2015, 14 Pages.

Final Office Action Issued in U.S. Appl. No. 13/171,446, Mailed Date Feb. 12, 2015, 36 Pages.

Non-final Office Action Issued in U.S. Appl. No. 13/171,446, Mailed Date: Jul. 11, 2014, 29 Pages.

Elmore, et al., "Who's Driving this Cloud? Towards Efficient Migration for Elastic and Autonomic Multitenant Databases", In UCSB Computer Technical Report May 2010, May 2010, 5 Pages.

Kolisko, Lukas, "PaaS overview", Retrieved from <<https://blogs.oracle.com/lkolisko/entry/platform_as_a_service_overview>>, May 25, 2009, 5 Pages.

Kyle, Bruce, "Cloud Roadmap Includes Virtual Machine Role, SQL Azure Reporting, Windows Azure Marketplace, and More", Retrieved from <<http://blogs.msdn.com/b/usisvde/archive/2010/10/28/cloud-roadmap-includes-virtual-machine-role-sql-azure-reporting-windows-azure-marketplace-and-more.aspx>>, Oct. 28, 2010, 3 Pages.

Mdingle, "Microsoft delivers Windows Azure Platform updates", Retrieved from <<https://blogs.technet.microsoft.com/stbnewsbytes/2010/11/30/microsoft-delivers-windows-azure-platform-updates/>>, Nov. 30, 2010, 2 Pages.

International Search Report & Written Opinion Issued in PCT Application No. PCT/US2012/039963, Mailed Date: Dec. 27, 2012, 9 Pages.

Sheth, et al., "Semantic Modeling for Cloud Computing, Part 1", In Proceedings of IEEE Internet Computing, vol. 14, Issue 3, May 2010, pp. 81-83.

Staten, James, "Windows Azure Crosses Over to IaaS", Retrieved from <<http://blogs.forrester.com/ames_staten/10-10-28-windows_azure_crosses_over_to_iaas>>, Oct. 28, 2010, 3 Pages.

Tang, et al., "Application Centric Lifecycle Framework in Cloud", In Proceedings of IEEE 8th International Conference Dn e-Business Engineering (ICEBE), Oct. 2011, pp. 329-334.

Tran, et al., "Application Migration to Cloud a Taxonomy of Critical Factors", In Proceedings of the 2nd International Workshop on Software Engineering for Cloud Computing, May 22, 2011, pp. 22-28.

China Search Report and Office Action for Application No. 201280032094.X, mailed Apr. 5, 2016, 12 pages.

Office Action Issued in Japanese Patent Application No. 2014-518572, Mailed Date: Mar. 28, 2016, 7 Pages.

Inoue, et al., "NTT Data added COBOL Cloud menu to migration services to provide legacy functions as cloud services", In Proceedings of the Nikkei Computer published by Nikkei BP CO., Ltd, Dec. 17, 2011, pp. 1-17.

Taiwan Search Report for Application No. 1001119169, completed Jan. 7, 2016.

Taiwan Office Action for Application No. 1001119169, dated Jan. 12, 2016.

"Office Action Issued in Australian Patent Application No. 2012276003", Mailed Date: Sep. 26, 2016, 4 Pages.

"Office Action Issued in Australian Patent Application No. 2012276003", Mailed Date: Nov. 7, 2016, 5 Pages.

"Second Office Action Issued in Chinese Patent Application No. 201280032094.X", Mailed Date: Nov. 10, 2016, Pages.

* cited by examiner

VIRTUAL MACHINE MIGRATION TOOL

RELATED APPLICATION

This application is a continuation application of prior application Ser. No. 13/171,446, filed Jun. 29, 2011, entitled "Virtual Machine Migration Tool", now allowed. The aforementioned application is incorporated herein by reference.

BACKGROUND

Recently there has been an increase in the use and availability of compute clouds, sometimes referred to as Platform as a Service (PaaS). Examples of compute clouds are WINDOWS AZURE™, AMAZON EC2™, BUNGEE CONNECT™, GOOGLE APP ENGINE™, and others. These compute clouds typically host many tenants, each running their own isolated web applications or web services that are typically accessed by client browsers. The tenant's applications often run in virtual machines (VMs). The compute cloud provides an execution environment that may handle changing conditions and demands in ways that are intended to be transparent to the applications. For example, balancing the load of incoming requests, provisioning network bandwidth, processing resources, storage, scaling applications (e.g., adjusting the number of instances), relocating virtual machines and application instances, etc. Shared computing clouds are managed by an operator entity, allowing tenants to be concerned primarily with their applications.

However, a computing cloud, as an execution environment, may have traits, including both benefits and limitations, that are inconsistent with applications not originally designed to run on the computing cloud. For example, consider a three-tier web application originally designed to run on particular operating systems using specific non-cloud resources (e.g., relational databases) and perhaps various software and hardware facilities. The application may have a web front-end with built-in logic for handling fluctuations in load. The front-end may interface with a middle-tier that implements business logic and interacts with local file storage and back-end storage such as a database. This application may have semantics for self-scaling that are not necessary in a cloud. The application may have its own database layer and accompanying management software that is not needed in the cloud. The application may have operating system configuration settings that conflict with control by the cloud (some clouds may not even require an operating system). Aspects of the application might need to be altered, removed, or added to allow the application to efficiently execute in a computing cloud.

Techniques discussed below relate to tools for migrating applications and virtual machines to computing clouds.

SUMMARY

The following summary is included only to introduce some concepts discussed in the Detailed Description below. This summary is not comprehensive and is not intended to delineate the scope of the claimed subject matter, which is set forth by the claims presented at the end.

Tools and techniques for migrating applications to compute clouds are described herein. A tool may be used to migrate any arbitrary application to a specific implementation of a compute cloud. The tool may use a library of migration rules, apply the rules to a selected application, and in the process generate migration output. The migration output may be advisory information, revised code, patches, or the like. There may be different sets of rules for different cloud compute platforms, allowing the application to be migrated to different clouds. The rules may describe a wide range of application features and corresponding corrective actions for migrating the application. Rules may specify semantic behavior of the application, code or calls, storage, database instances, interactions with databases, operating systems hosting the application, and others.

BRIEF DESCRIPTION OF THE DRAWINGS

The present description will be better understood from the following detailed description read in light of the accompanying drawings, wherein like reference numerals are used to designate like parts in the accompanying description.

Many of the attendant features will be explained below with reference to the following detailed description considered in connection with the accompanying drawings.

DETAILED DESCRIPTION

Overview

Embodiments discussed below relate to migrating tools for migrating applications to computing clouds. Discussion will begin with explanation of computing clouds, followed by several examples. An example application will be discussed. Tools and techniques for migrating will be described next, including migration tools, migration rules, and processes for migration.

Computing Clouds

Figure 1:
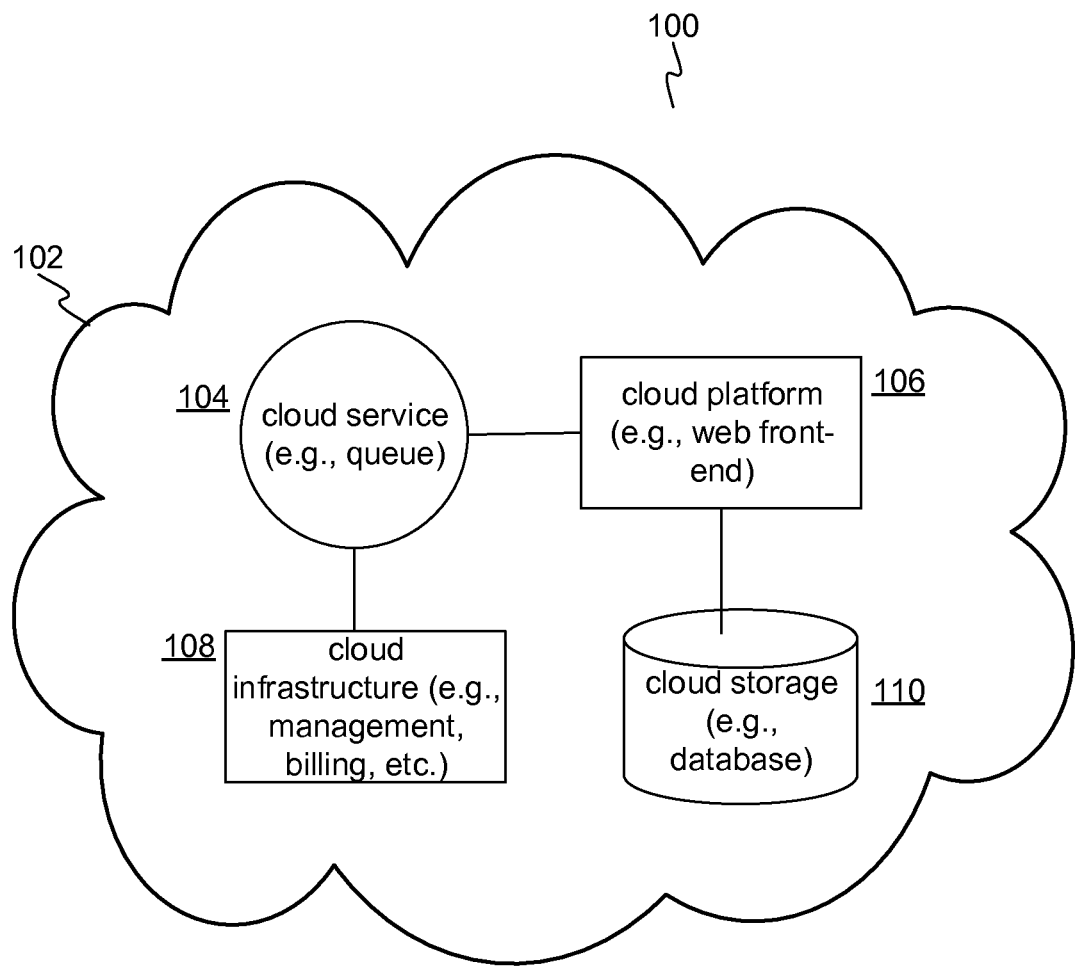
FIG. 1 shows a generic computing cloud.

FIG. 1 shows a generic computing cloud 100. A data network 102 provides connectivity between various computers (not shown) that make up the computing cloud 100. Generally, a large number of computers host virtual machines that host isolated tenant applications. Various cloud services 104 may provide functions such as a communication queue, load balancing, etc. A cloud platform 106 may act as the interface for tenants through which they may upload and manage their applications. The cloud platform 106 may also wrap and manage applications of tenants, in effect providing a compute environment for each application. Cloud infrastructure 108 may include billing and management elements. For instance, the cloud infrastructure 108 may bring computers online and offline to handle changes in load of applications and/or the computing cloud 100. Cloud storage 110 may take various forms, for instance a relational database service that provides instances of databases controlled and configured by respective tenants, simple blob (binary large object) storage, table storage, file system storage, etc.

Figure 2:
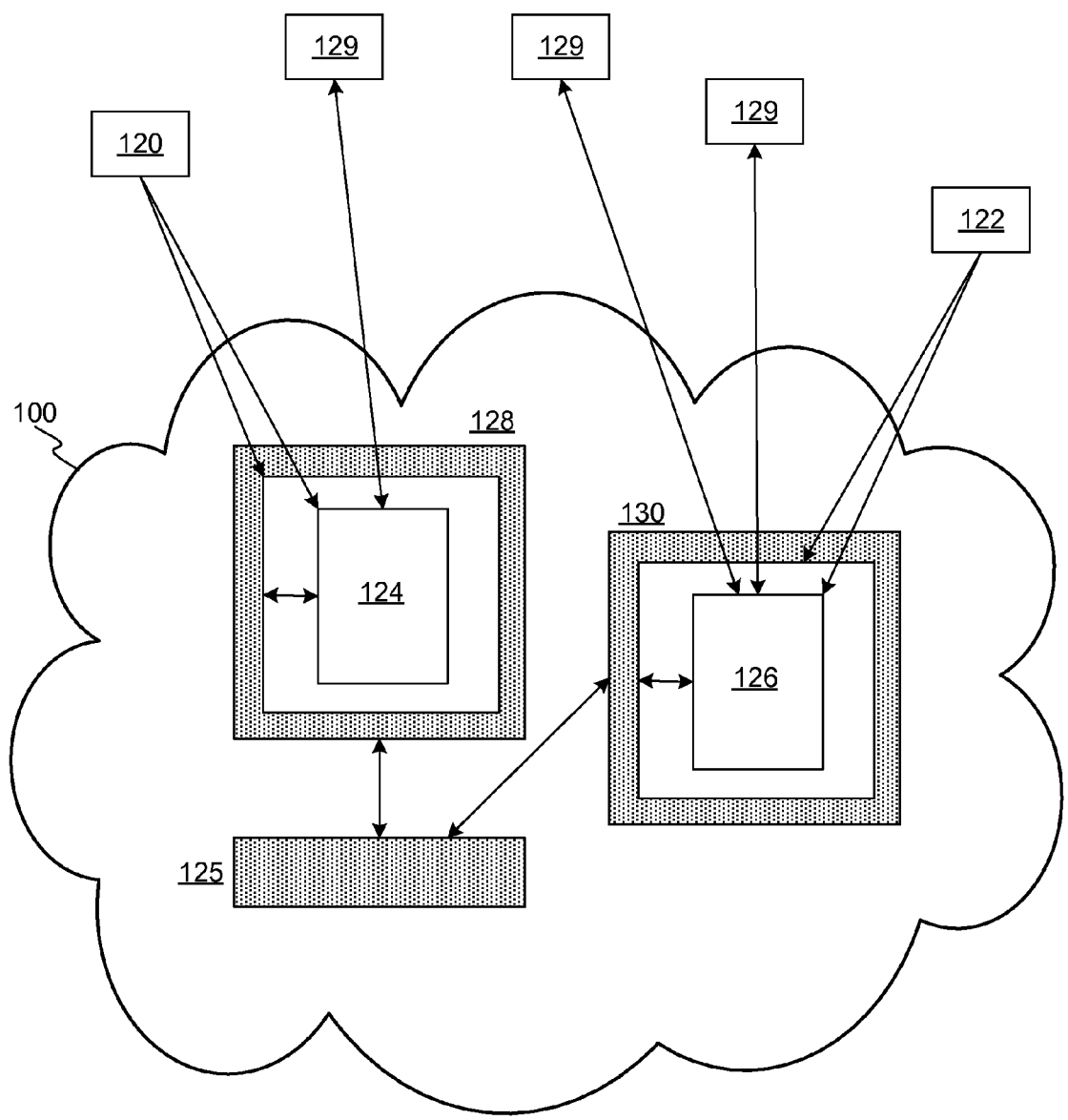
FIG. 2 shows another view of generic computing cloud.

FIG. 2 shows another view of generic computing cloud 100. In this view, tenants 120, 122 have respective cloud-hosted applications 124, 126. The computing cloud 100 has a fabric 125 that manages compute environments 128, 130 for the applications 124, 126. The fabric 125 may have many computers running VMs with guest operating systems, storage services, etc. The applications 124, 126 may comprise various components typical for web-based access and may use resources provided by the computing cloud 100. The compute environments 128, 130 may be analogous to AMAZON EC2 instances (as configured by Amazon Machine Images (AMIs)), roles (as in MICROSOFT AZURE), sandboxed simulated partial operating systems with managed code environments (as in GOOGLE APP ENGINE), etc. The compute environments 128, 130 may be "expanded" by the fabric 125 according to current conditions such as load, network traffic, unexpected failures, and so on. Such expansion may involve transparently adding or removing computation resources (hardware, VMs, service instances, database instances, etc.) according to need.

The applications 124, 126 are uploaded and configured by the tenants 120, 122. The applications 124, 126 run as managed by the computing cloud 100, and clients 129 access instances of the applications 124, 126 using browsers or other types of client software. Note that from the application perspective, the application is running on a platform and activity of the computing cloud 100 is mostly transparent. The applications are accessed via communications protocols without any concern for the underlying hardware, data network, or the cloud layer between the application and the client.

Figure 3:
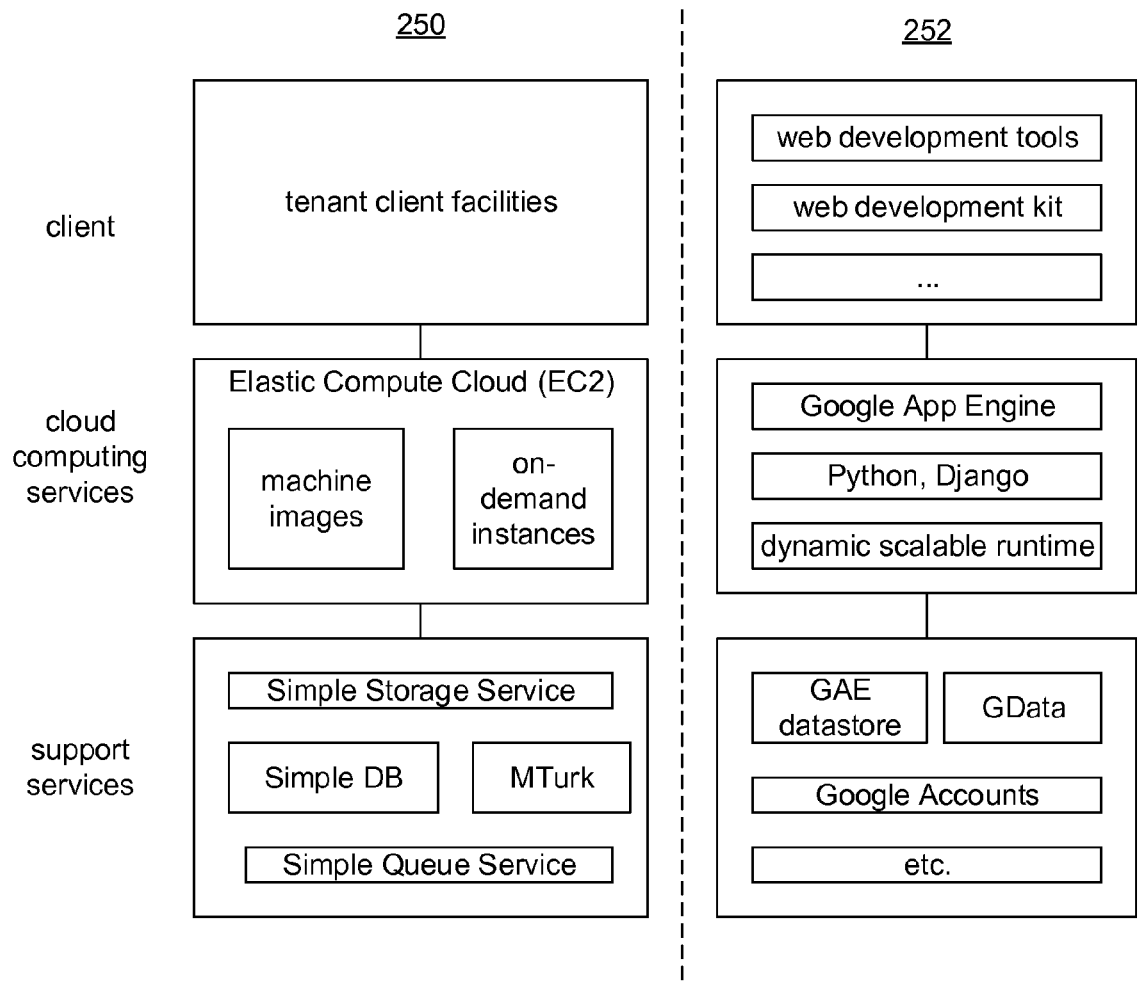
FIG. 3 shows two example computing cloud architectures.

FIG. 3 shows two example computing cloud architectures. Cloud architecture 250 is a version of the AMAZON EC2. Application development and deployment is handled by the tenant client. The cloud provides cloud computing services in the form of machine images and on-demand instances. Applications are hosted in guest operating systems in virtual machines. Instances of virtual machines and databases are provided by the cloud as needed from support services. A queue service may facilitate communication between virtual machines and application instances. Details of how these components work and cooperate are available elsewhere.

Cloud architecture 252 is a version of the GOOGLE APP ENGINE cloud. Various development tools are used to build and deploy an application. The App Engine itself is fully documented elsewhere. A key feature is that once an application is deployed, the GOOGLE APP ENGINE automatically handles scaling; resources and/or instances are added and removed as needed. Various support services may be accessed by applications. Account services, data table services, and others, are used by the applications, and these resources are also scaled and managed by the cloud.

Figure 4:
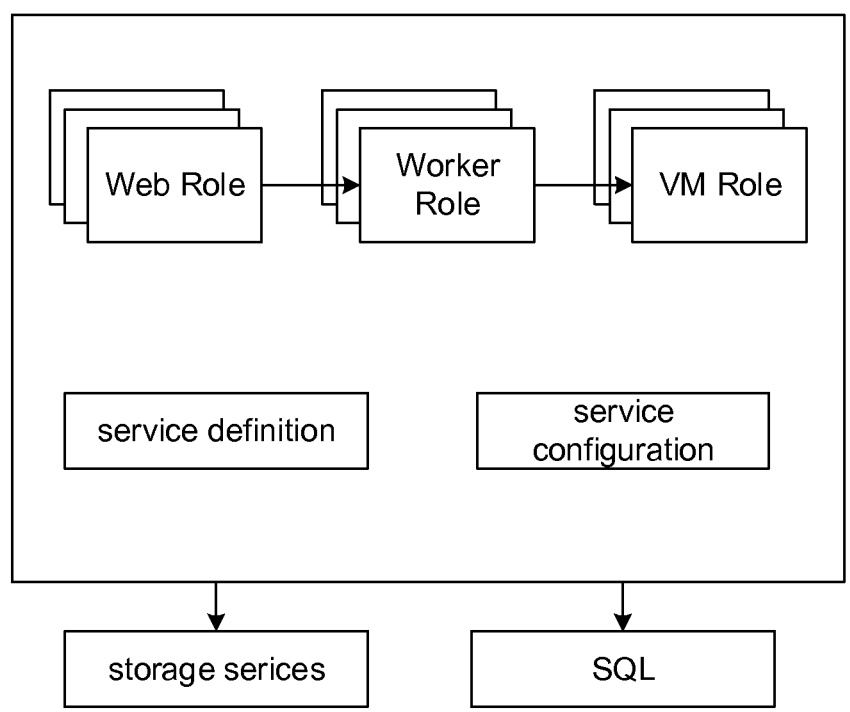
FIG. 4 shows another computing cloud architecture.

FIG. 4 shows a computing cloud architecture 254 for a version of MICROSOFT AZURE™. Roles are provided, which are discrete scalable components built with managed code. Worker roles are for generalized development, and may perform background processing for a web role. Web roles provide a web server and listen and respond for web requests via an HTTP (hypertext transfer protocol) or HTTPS (HTTP secure) endpoint. VM roles are instantiated according to tenant defined configurations (e.g., resources, guest operating system). Operating system and VM updates are managed by the cloud. A web role and a worker role run in a VM role, which is a virtual machine under the control of the tenant. Storage and SQL services are available to be used by the roles. As with other clouds, the hardware and software environment or platform, including scaling, load balancing, etc., are handled by the cloud.

To summarize, in PaaS-type computing clouds, the cloud computing platform itself handles most administrative functions. The platform may automatically (and transparently to tenants) handle things such as applying operating system patches, installing new versions of system or database software, onlining computers and VMs, migrating VMs, allocating network bandwidth, and so on. This transparent management, which might intersect with some semantic behavior of applications (discussed in the next section), nonetheless can eliminate application unavailability due to patching, hardware failures, overload, and other reasons. Moreover the cloud, which is in control of the physical and virtual machines, handles application scaling; the cloud assures that appropriate levels of resources are available at any given time. Computing cloud platforms may have other features. For example, browser-based development tools, seamless deployment to a hosted runtime environment in the cloud (i.e., the ability to deploy and start an application from a client accessing the cloud), web-based management and monitoring tools for tenants, pay-as-you-go billing, and others.

Application Migration

As suggested above, an application not originally built to run in a computing cloud can have design traits (semantics), code properties, and configuration features that may be affected by a computing cloud's architecture and services. An application may have functionality such as load balancing and scaling that is redundant in a cloud environment. An application might also have features that in a cloud environment can lead to errors, data loss, or other failures. When migrating an application to a cloud environment, there are often modifications that can or should be made for compatibility, reliability, efficiency, minimizing cost, proper installation, and so on.

Figure 5:
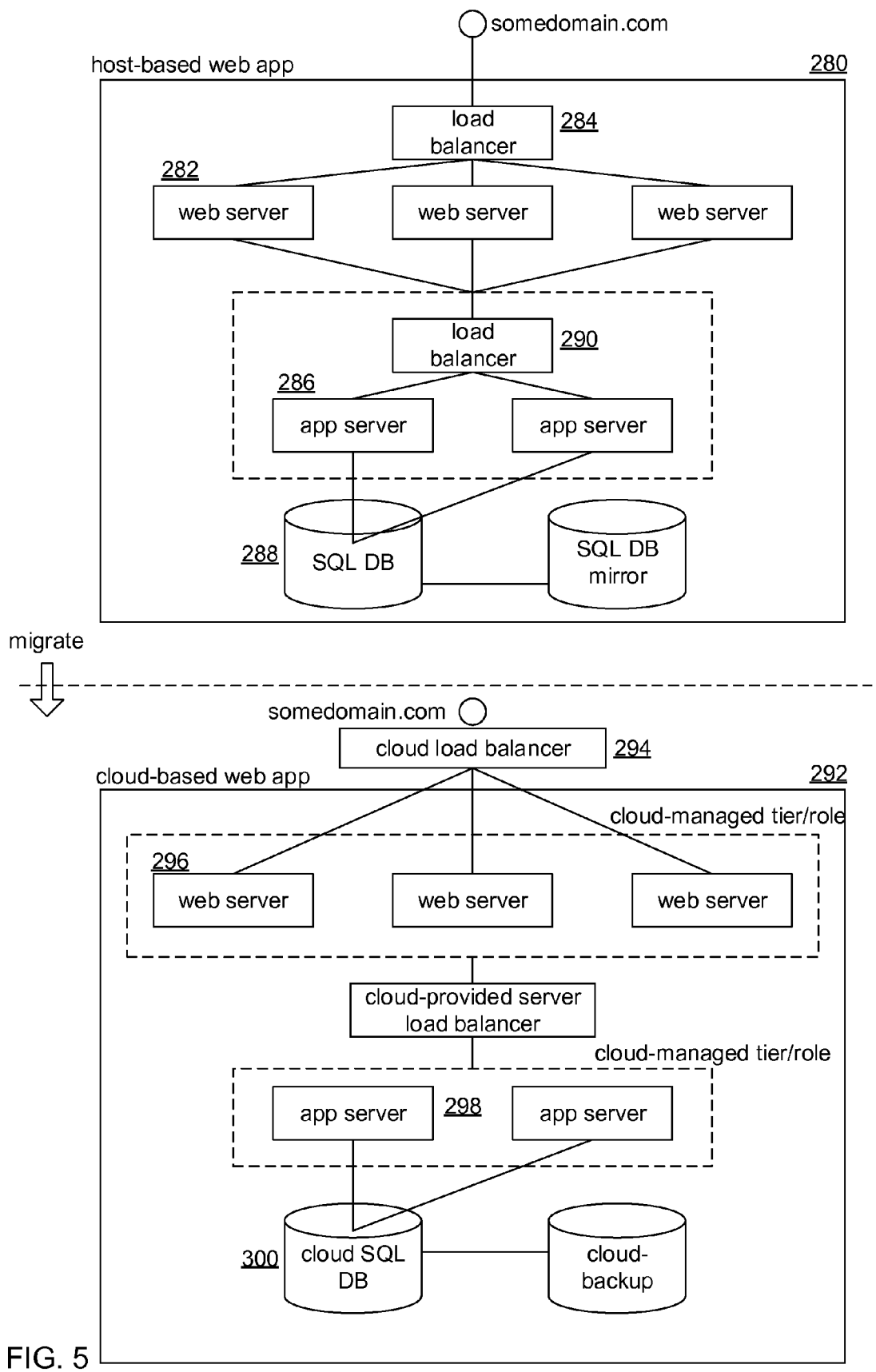
FIG. 5 shows an example migration of a target application to a computing cloud.

FIG. 5 shows an example migration of a target application 280 to a computing cloud. The target application 280 is a machine or host-based application originally designed for a specific operating system and custom infrastructure, for example, an in-house information technology (IT) environment. The target application 280 has a three-tier architecture, including a front-end of web servers 282 that handle client requests. A custom-built load balancer 284 distributes client requests among the web servers 282. A middle tier includes application servers 286 that handle the logic and main functionality of the target application 280. The middle tier stores data and application state in a database managed by an SQL server 288 (i.e., SQL DB). The SQL server maintains a database mirror for failover and backup. The application servers 286 interface with the SQL server 288 with SQL calls or the like. Load balancer 290 balances interaction between the web servers 282 and the application servers 286. The target application 280 may have custom logic for scaling by adding instances of any of the aforementioned elements. Moreover, there may be a layer of administrative software managing the computer platforms on which the target application 280 executes. This layer may perform backups, system updates, restarts of zombie processes or systems, migration of virtual machines between host computers, redirection to failover systems, and so on.

The lower part of FIG. 5 shows migrated application 292. The migrated version may be modified in numerous ways, discussed later. For example, a load balancing mechanism 294 might be provided by the computing cloud (without visibility to the migrated application 292). The migrated application 292 web servers 296 might have HTTP servers removed and rely on the computing cloud to handle HTTP requests. Or, the web servers 296 might be instantiated and managed by the cloud. The cloud might also provide load balancing and scaling for migrated application servers 298. The data tier of the migrated application 292 still uses SQL statements and logic (perhaps modified), but the application data is now stored and served from a cloud-managed database instance 300. The tenant that installs the migrated application 292 into the cloud may still configure the database and specify its requirements, but the database is provided by a database service that provides (and isolates) databases for other tenants in the cloud, generally according to user-provided schema or the like. A migration tool and details of other possible modifications to the application thereby will be described next.

Figure 6:
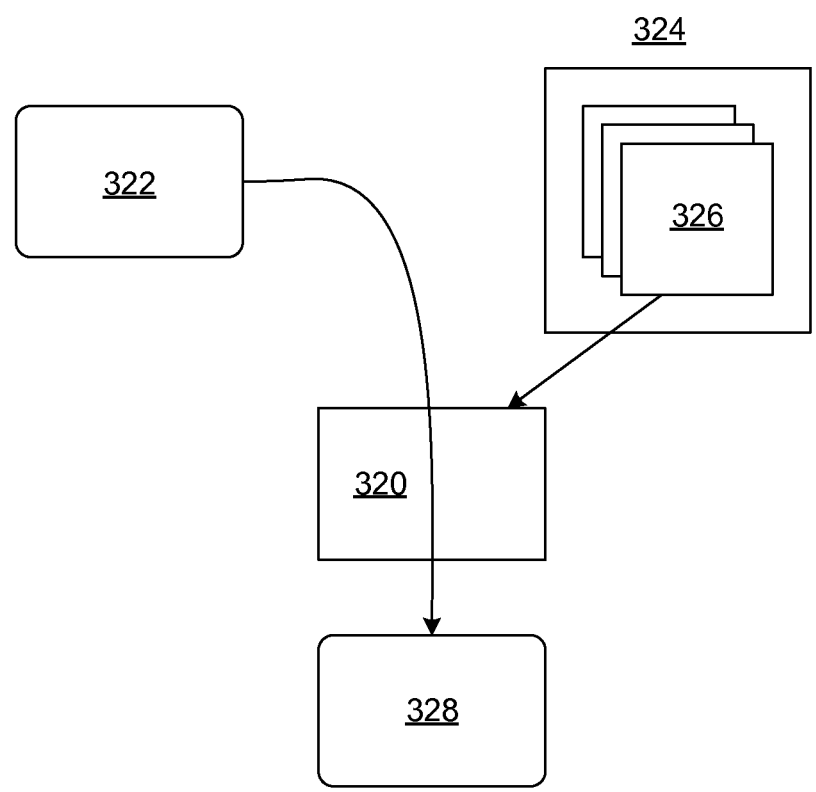
FIG. 6 shows a migration tool.

FIG. 6 shows a migration tool 320. The migration tool runs on one or more computers and performs migration analysis on a selected application 322, possibly modifying the selected application 322 and/or outputting information to allow a developer to manually modify the selected application 322. The tool uses a migration library 324 having sets of migration rules 326 for respective clouds. For example, one set of migration rules 326. When a user is using the migration tool 320, a target cloud platform is selected, and a corresponding set of migration rules 326 is used by the migration tool 320 to generate migration output 328. The migration output 328 can be revised source code, patches to be applied to the selected application 322, reports advising code, semantic, or architectural changes, or a combination of such outputs.

Figure 7:
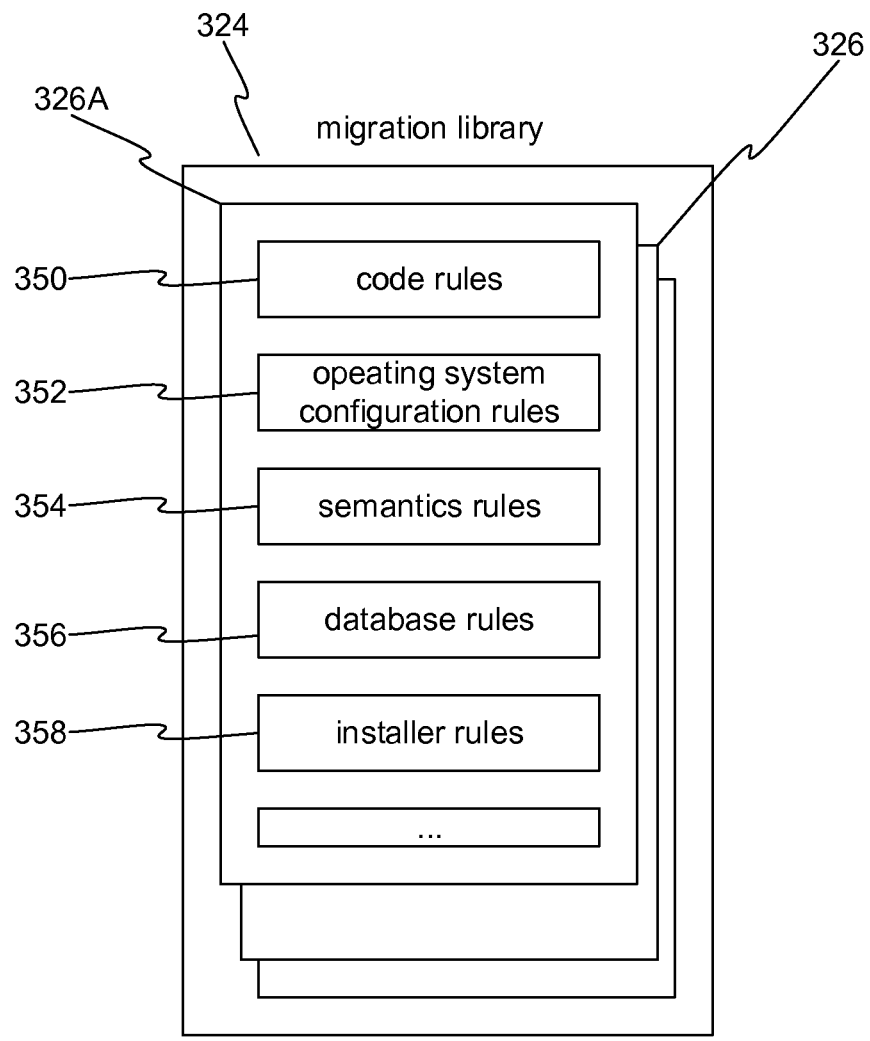
FIG. 7 shows a view of the rules or migration library.

FIG. 7 shows a view of the rules or migration library 324. As mentioned, there may be different sets of migration rules for different computing cloud platforms. An example rule set 326A might include code rules 350, operating system rules 352, semantic rules 354, SQL or database rules 356, installer rules 358, and/or others.

The code rules 350 might include rules of the form: <condition><action>. A condition may specify a code statement's syntax, a specific library that should be included or excluded, a specific storage type or location, a path, and so forth. Common code patterns might also be specified. Actions can vary. Some actions may modify code or insert a pre-defined comment. Other actions may add output to a migration report log. The code rules 350 might recognize a set of specific calls or methods and convert them to a cloud-specific application programming interface (API). A rule might recognize a call to a specific license server or license library. A rule might also recognize code that is directed to a network service (e.g., Active Directory™) that is not available in the target computing cloud. Corresponding corrective actions; reports and/or revisions, may be include.

A set of operating system configuration rules 352 may be provided for environments where the target application is built for a specific operating system (after migration, in the form of a VM guest in the cloud). In some cases, the operating system rules might relate to application code that interfaces with the operating system. In cases where the computing cloud allows the tenant to specify or install a particular operating system, the rules might directly inspect the operating system. For example, if the relevant computing cloud automatically handles guest operating system updates, guest operating systems should be configured to disable automatic updates. Permissions or special user accounts may be modified or added. Some clouds may support only specific operating system versions (release versions, 32 versus 64 bit versions, etc.), so the rules might identify an operating system need and actions might involve changing the operating system, upgrading the operating system, or flagging a need to do so. In some clouds, it might be advisable, for consistency, to set operating system time zone settings to a particular time zone setting, for instance Coordinated Universal Time (UTC), because application instances or VMs might be running across multiple geographic time zones. Again, corresponding corrections or patches may be included with the rules.

Semantic rules 354 may specify architectural or design aspects of the target application. For example, as noted above, some application features may become obsolete in a computing cloud. Semantic rules 354 might specify clues to recognize load balancers, scaling logic, data backup or mirroring, and others. Clues can come from a build manifest, keyword recognition, or known telltales of off-the-shelf or open-source components. Clues can also come from automated code analysis, which may involve compiling code and analyzing or profiling traits of the code. Semantic properties to recognize might include restart logic (to be handled by the cloud), resource usage, and failover logic. In some clouds, because VMs may be moved (stopped and restarted) at will by the cloud, the rules may recognize parts of an application that rely on local storage, recommending the use of a cloud-based persistent storage in order to reliably maintain state of the application. In one embodiment, a rule may recognize that state stored by one instance of an application component must be recognized by new instances started automatically by the cloud. Other semantic rules might add (or suggest adding) hooks to recognize when a host operating system has entered a sleep or paused state (or restarted), in order to allow an instance of the application to confirm, for instance upon resumption of its host VM, that it has state that is consistent with its state prior to the interruption.

Storage or database rules 356 may involve rules related to shifting from an ordinary database server to a cloud-based database server, which might be an instance of a database service that is part of the computing cloud. These rules might also involve shifting from a particular database to another form of storage such as blob storage in the cloud, key-value storage in the cloud, simple data tables from a table service, etc. In general, as mentioned above, there may be rules that attempt to shift storage strategy of the application from storage on the VM hosting the application to cloud-based storage. Other database rules 356 may look for particular SQL calls, database mirroring logic. A connection rule may be included to cause more frequent connection checking during database transactions. For example, some cloud-based database services may frequently spin up new instances and shut down old instances of an application's database; the original application may assume that a connection remains available through a span of code, whereas connection checking is helpful when migrated to the cloud. In another embodiment, cloud-based databases might not guarantee transactions across multiple tables; a rule might flag SQL transactions that involve multiple tables. Unsupported or unneeded SQL calls might also be recognized.

Installer rules 358 might inspect an install package format of the target application and apply rules related to installing on the target cloud. For instance, if the computing cloud exercises control over VMs hosting the application, various install components might need to be relocated, components (for instance, assemblies or libraries) that the original application assumes to be present might in fact need to be included in the migrated application's installation process. Settings of some application components might need to be altered when being installed in a cloud-based environment. In one embodiment, an entire install package might be flagged as incompatible with the cloud. In another embodiment, an install rule might convert an install package of the application from one format to a format compatible with the target cloud. A rule may also add credentials needed access the cloud in order to install the application. Again, corresponding actions, corrective and/or advisory, may be included with the rules.

Other types of rules may also be included. In one embodiment, the migration library may include cost information about the relevant clouds. Such information might describe how costs accrue in the cloud and the costs for various units of cloud resources. The rules in turn may access the cost information to perform analysis about potential costs of the application in the target cloud. Such analysis might involve. In one embodiment, the cost information may include information about licensing rights or opportunities in the target cloud. These rules, when applied, might add to a migration report a recommendation to seek new licensing arrangements for components (for instance, guest operating systems, database instances, etc.) of the application, or license offers from the cloud's operator (or other vendors) that would cover license requirements and therefore avoid need to separately pay for a license.

The numerous rules mentioned above are not limiting; other specific rules and other categories of rules may be used. Moreover, a rule is simply a convenient form of representing information about needs and preferences in a computing cloud. The term "rule" as used herein, is defined to include any information that describes an original condition of an arbitrary application (is applicable to arbitrary applications) or its environment and a corresponding aspect of a specific computing cloud that is relevant if the application is to be executed in the computing cloud. As used herein, a "rule" also is defined to include any action that might be taken when a condition specified by the rule is determined to be present in the target application, including actual modifications, generation of patches or reports, or other information that can be used. Therefore, in practice, rules may take many forms, including statements in a declarative or logic language, ordinary procedural code including scripting language, compiled code, and so forth. The types and nature of rules may vary from one rule set 326 to the next, depending on the specific computing clouds that correspond to the rule sets. In one embodiment, there is only one rule set 326; the migration library 324 is for only one implementation of a computing cloud. In yet another embodiment, the rules are implemented as part of the executable tool.

Figure 8:
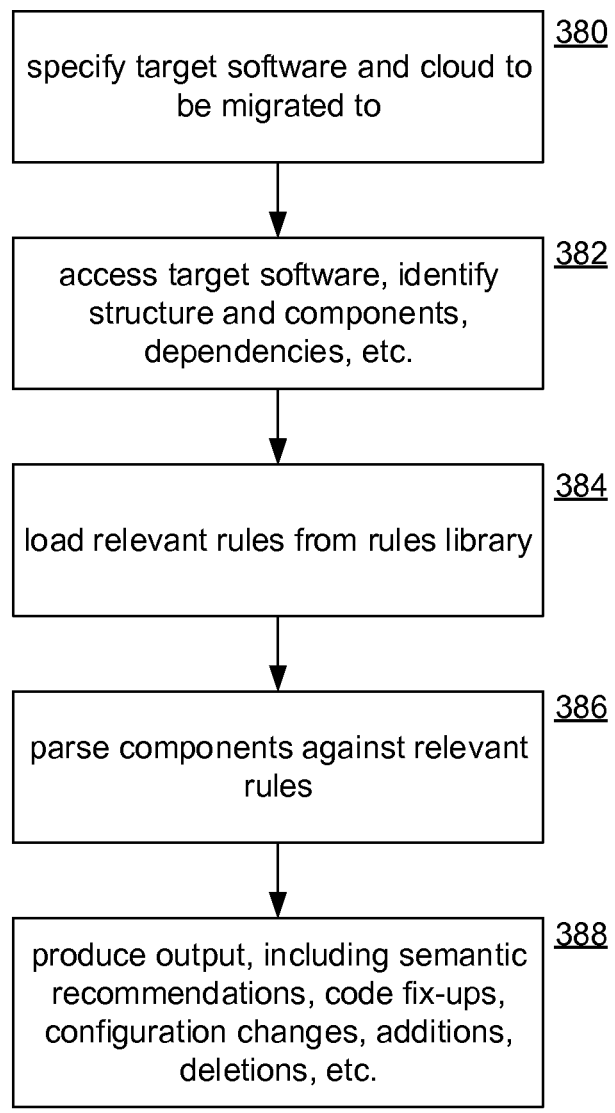
FIG. 8 shows a process performed by migration tool.

FIG. 8 shows a process performed by migration tool 320. At step 380, a user of the migration tool 320 specifies the target software or application to be migrated to a computing cloud (the tool and rules are designed to be applicable to any application). At step 382, the migration tool 320 accesses the target application. This may involve opening a package format, reading source code files and configuration files, mounting a VM image, or other means for looking into the application. The migration tool 320 may identify relations between elements, dependencies, relevant files (e.g., manifests and build scripts), and so forth. At step 384 the relevant rule set is loaded from the rules library. At step 386 the various components of the application of parsed and the relevant rules are applied. At step 388, output is generated. The output may take the various forms mentioned above, including patches, code fixes, recommendations, or others.

Figure 9:
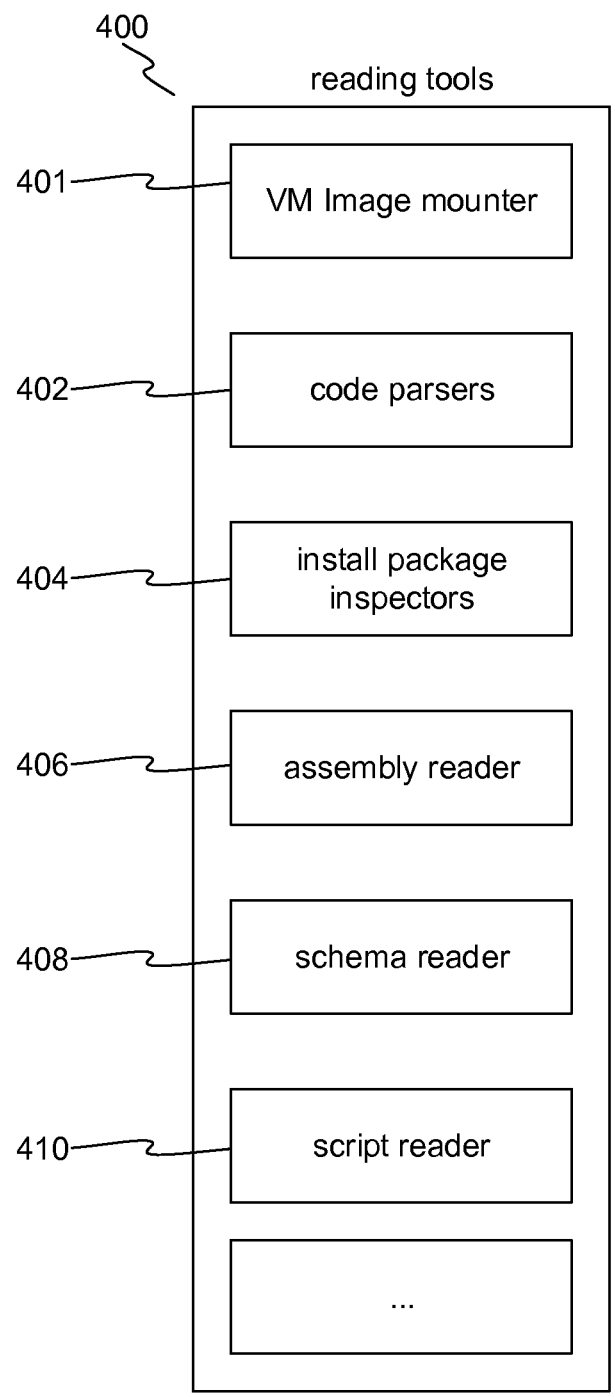
FIG. 9 shows an example set of reading tools used by the migration tool.

FIG. 9 shows an example set of reading tools 400 used by the migration tool 320. To access the contents of an application, the migration tool 320 might use a VM image mounter 401, code parsers 402, install package inspectors 404, assembly readers 406, schema readers 408, script readers 410 or parsers, compilers, software development environments, and/or any other known techniques that are relevant to the type of application being migrated. The VM image mounter 401 might be configured to read a VM image format and mount the image onto a filesystem.

CONCLUSION

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any apparatus for storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of migrating applications to an application hosting cloud that hosts any applications for access by clients over the Internet, the method comprising:
   selecting a target application to migrate to the application hosting cloud, the application hosting cloud providing cloud-based virtual platforms wherein applications can execute as if on a hardware platform, the target application, prior to migration, configured to execute on a particular computer host platform;
   passing the target application to a migration tool, wherein the migration tool is provided with access to a rules library comprising one or more pluralities of migration rules, wherein each plurality of migration rules corresponds to a respective different application hosting cloud, and wherein each plurality of migration rules describes at least one of code rules, operating system rules, semantics rules, database rules, or installer rules;
   parsing and analyzing source files and configuration files of the target application with the migration tool to identify one or more migration rules from the rules library that are determined to be applicable to the target application, a migration rule configured to provide information relating to transforming references to a particular network service to an analogous service provided by the application hosting cloud; and
   applying the identified one or more migration rules to the target application to generate a report describing modifications to the source and configuration files of the target application from being configured for the particular computer host platform to being at least partly configured for the application hosting cloud.

2. A method according to claim 1, wherein an identified rule comprises a condition comprising a semantic behavior of the application.

3. A method according to claim 2, wherein the analyzing comprises identifying a configuration setting of the target application, and wherein an identified rule corresponding to the configuration setting causes an entry regarding the configuration setting to be added to the report.

4. A method according to claim 1, wherein the one or more identified rules comprise rules related to data persisting in the application hosting cloud.

5. A method according to claim 4, wherein the applying the one or more identified rules comprises identifying parts of the target application that perform functionality that is handled by the application hosting cloud.

6. A method according to claim 1, wherein the report identifies potential modifications to the target application to enable execution in the application hosting cloud.

7. A method according to claim 1, wherein one of the one or more identified rules defines an SQL (structure queried language) code construct and a corresponding code modification description, wherein the applying the one or more identified migration rules includes determining that the one of the one or more identified rules is applicable to a portion of code of the target application that matches the code construct.

8. A method of migrating an application to a platform as a service (PaaS) cloud, the method comprising:
accessing a target application selected for migration analysis with respect to the PaaS cloud, the target application, prior to the migration analysis, configured to execute on a particular computer host platform;
passing the target application to a migration tool wherein the migration tool comprises a rules library comprising one or more pluralities of migration rules, wherein at least one plurality of migration rules is specific to the PaaS cloud, and wherein the pluralities of migration rules describes at least one of code rules, operating system rules, semantics rules, database rules, or installer rules;
accessing, from the rules library, a plurality of migration rules specific to the PaaS cloud, the plurality of migration rules configured to identify, when applied to any applications, use of, or reference to, by the applications, software elements that are (i) to be used by the applications and that have (ii) equivalents provided by the PaaS cloud, the plurality of migration rules for identifying changes to be made to the applications when being configured to be hosted in the PaaS cloud;
applying the plurality of migration rules from the rules library to the target application while the target application is not configured to execute in the PaaS cloud, the target application configured to use one of the software elements provided by a system other than the PaaS cloud, the applying comprising parsing files configured to be used for installing or compiling the target application so that a form of output can be generated, wherein the output indicates modifications to the target application to cause the target application use a software element provided by the PaaS cloud instead of the corresponding software element identified by one of the migration rules in the plurality of migration rules.

9. A method according to claim 8, wherein additional migration rules identify code of the target application that can be converted from using a non-cloud network resource to using a network resource provided by the PaaS cloud.

10. A method according to claim 9, wherein the non-cloud resource comprises a load balancing resource, a database service resource, a data storage service, or a scaling resource.

11. A method according to claim 8, wherein the target application comprises at least in part a web front-end and the modifications relate to how client state is maintained by the web front-end.

12. A method according to claim 8, wherein the plurality of rules comprises rules related to data persisting in the PaaS cloud.

13. A method according to claim 8, wherein one of the rules in the plurality of rules, when applied to the target application, provides a recommendation or modification that, if implemented, will eliminate a licensing cost, associated with the target application, of a corresponding one of the software products.

14. A method according to claim 8, wherein the rules library comprises pluralities of rules corresponding to respective PaaS clouds, the method further comprising selecting the plurality of rules from among the pluralities of rules.

15. An apparatus comprising:
a computer;
storage hardware coupled with the computer and storing information configured to enable the computer to execute a migration tool executable by the computer, the migration tool having access to a rules library comprised of migration rules describing source code features, and at least one of configuration, code, operating system, database, or installer properties that can be applied against any applications to be migrated to a platform-as-as-service (PaaS) cloud, the rules library further comprising one or more rules configured to identify application logic that references application resources having equivalent cloud resources in the PaaS cloud;
the migration tool comprising one or more parsers configured to parse code and configuration files of a target application, the parser further configured to parse the code and configuration files of the application to identify rules in the rules library that are applicable to the application; and
the migration tool further configured to apply the identified rules to the application to generate an output that identifies changes to be made to the application to enable or improve execution of the application in the PaaS cloud, the identified changes including changing a reference to an application resource reference to a reference to an equivalent cloud resource.

16. An apparatus according to claim 15, wherein some of the rules describe SQL calls or statements, and the applying comprises identifying modifications to the code of the target application such that the calls or statements in the code, if modified according to the identified modifications, are able to execute in the PaaS cloud.

17. An apparatus according to claim 16, wherein the modifications to the code correspond to modifying the calls or statements to comprise an invocation of a database service in the PaaS cloud, the database service comprising part of the PaaS cloud available for any applications executing in the PaaS cloud, the database service providing respectively isolated and scalable database instances for the applications.

18. An apparatus according to claim 15, wherein one or more of the rules, when applied to the target application, identifies storage logic of the target application that specifies storage on a local file system and identifies a revision to the logic to instead use a persistent data storage service of the PaaS cloud.

19. An apparatus according to claim 15, wherein the code of the target application comprises Java source code.

20. An apparatus according to claim 15, wherein the target application comprises a database schema and the migration tool comprises a component configured to read the standard deployment package format.

* * * * *